United States Patent

[11] 3,625,763

[72] Inventor Manlio B. Melillo
Inglewood, Calif.
[21] Appl. No. 780,998
[22] Filed Dec. 4, 1968
[45] Patented Dec. 7, 1971
[73] Assignee The Bunker-Ramo Corporation
Canoga Park, Calif.

[54] CONFORMAL COATING STRIPPING METHOD AND COMPOSITION

8 Claims, 3 Drawing Figs.

[52] U.S. Cl. .......... 134/38, 134/6, 134/42, 252/171, 252/173, 252/364

[51] Int. Cl. .......... B08b 7/00, C09d 9/00, C23g 5/02

[50] Field of Search .......... 134/6, 38, 40, 42; 252/162, 170, 171, 173, 364, DIG. 9, DIG. 8

[56] References Cited

UNITED STATES PATENTS

| | | | |
|---|---|---|---|
| 1,884,164 | 10/1932 | Othmer | 252/171 |
| 1,884,633 | 10/1932 | Ellis | 252/DIG. 8 |
| 1,884,765 | 10/1932 | Lougovoy | 252/DIG. 8 |
| 1,884,766 | 10/1932 | Lougovoy | 252/DIG. 8 |
| 1,938,714 | 12/1933 | Mills et al. | 252/DIG. 8 |
| 2,371,644 | 3/1945 | Petering et al. | 252/171 X |
| 2,507,984 | 5/1950 | Kuentzel | 252/DIG. 8 |
| 2,999,815 | 9/1961 | Eiseman | 252/171 |
| 2,999,816 | 9/1961 | Bennett et al. | 252/171 |
| 2,999,817 | 9/1961 | Bower | 252/DIG. 9 |
| 3,085,116 | 4/1963 | Kvalnes | 252/DIG. 9 |
| 3,338,756 | 8/1967 | Leon | 134/38 X |
| 3,340,199 | 9/1967 | Clay et al. | 252/171 |
| 3,400,077 | 9/1968 | Orfeo et al. | 252/364 X |
| 3,455,835 | 7/1969 | Burt | 252/DIG. 9 |
| 2,563,417 | 8/1951 | Pessel | 134/6 |
| 3,432,347 | 3/1969 | Mandell et al. | 134/38 |

FOREIGN PATENTS

| | | | |
|---|---|---|---|
| 238,656 | 5/1962 | Australia | 252/171 |

OTHER REFERENCES

Lee-Neville; Handbook of Epoxy Resins; McGraw-Hill; New York, N.Y.; 1967 (page 25- 21 relied on)-copy in A. V. 143, Title page also supplied.

*Primary Examiner*—Joseph Scovronek
*Assistant Examiner*—Barry S. Richman
*Attorney*—Frederick M. Arbuckle

ABSTRACT: A liquid composition for stripping resin coatings such as epoxy embedment or conformal coatings from substrates such as printed circuit boards. The composition is a substantially anhydrous combination of organic liquids comprising on a volume basis above about 60 percent of a halogenated hydrocarbon liquid, a minor amount below 12 percent but above 4 percent of an alcohol and below 5 percent but at least 1 percent of a ketone. The resin coating is contacted with the composition for a period sufficient to loosen and solvate said resin. The removal of the softened resin may be facilitated by brushing.

INVENTOR.
MANLIO B. MELILLO
BY Lindenberg + Freilich
ATTORNEY

CONFORMAL COATING STRIPPING METHOD AND COMPOSITION

BACKGROUND OF THE INVENTION

1. Field of the Invention

The present invention relates to a composition useful in removing resin films from substrates, and more particularly, this invention relates to a liquid stripper for removing embedment or conformal epoxy coatings from electronic components or assemblies, e.g., printed circuit boards.

2. Description of the Prior Art

Electronic components are encapsulated, embedded or conformally coated with resins for several reasons. The resin barrier protects the component from environmental effects such as moisture, dust contamination, corrosion, oxidation and fungus attack. The resin also provides mechanical support, maintains spacing between components, and furnishes a cushion against physical shock. Electrically, the resins insulate the components from their surroundings.

Epoxy resins, because of their tenacious adhesion, extreme toughness and moisture, impact, chemical and electrical resistance, appear to be the resin of choice for encapsulation, embedment and conformal coating applications. However, due to the resistance of epoxies to typical solvents, they are very difficult to remove once cured. Various film strippers for removing epoxies have been proposed. However, these strippers contain chemically aggressive agents such as hydrofluoric acid, hydrogen peroxide or trichloroacetic acid. These agents are hazardous to personnel, require special handling and containers, and can adversely affect the insulator or conductor portions of the encapsulated component or the printed circuit board laminate itself.

Therefore, chemical stripping agents have been avoided in many cases and it has been found necessary to scrap certain components or to remove the resin by physical means such as sandblasting, burning, heating, cutting, scraping, etc., or the application of hot soldering irons.

Printed circuit boards contain numerous components. Therefore, the failure of one component involves a considerable loss unless the finished board can be conveniently and successfully reworked and repaired, preferably in the field. The present practice is to remove the tough conformal coating by cutting it away with blades or knives, by application of a hot tip, scraping, melting or a combination of these methods. These are time-consuming operations requiring a skilled operator to minimize damage to the board. None of these techniques are acceptably practical, economical, or safe for the operator and they all leave the board in a somewhat damaged condition. This problem is most severe in the field when it becomes necessary to repair or replace a component.

OBJECTS AND SUMMARY OF THE INVENTION

It is therefore an object of this invention to provide a safe, efficient, and economical means of removing films from substrates.

A further object of the invention is the provision of a stripper for electrical component embedment resins capable of loosening films of the resin on contact therewith.

These and other objects and many attendant advantages of the invention will become apparent as the description proceeds.

In accordance with the invention, a liquid chemical stripper is provided that loosens a film of resin from a substrate within a few minutes after contacting the film with the liquid stripper by dipping, spraying, brushing, etc. The liquid stripper comprises a mixture of organic solvents in miscible proportions that provides a combined swelling, penetrating, and film bond-breaking effect. The solvents are liquid throughout the entire range of temperatures employed to remove the films. Individually, these solvents have little effect on the films, but when combined, the stripper exhibits a very active solvating and loosening effect.

The stripper composition of the invention comprises on a volume basis a major proportion, usually above about 60 percent of a halogenated hydrocarbon liquid, preferably a mixture of chlorinated aliphatic materials. The stripper further comprises a minor amount, below 12 percent and preferably at least 4 percent, of an alcohol. Also present is a minor amount, below 5 percent but at least 1 percent, of a ketone. The stripper should be substantially anhydrous. Water content should be maintained below 2 percent.

As best understood from a mechanistic point of view, the resin macromolecules contain active centers which bind the macromolecules to each other and to substrates by forces of attraction or aggregation. The solvation action is a disgregation effect in which the solvent molecules attach themselves to the active centers and dislodge the bimacromolecular bond to partially free the resin strand. The solvation effect takes place in stages through the thickness of the film. The first stage is the penetration of the interstices between the macromolecular chains. The second stage is solvation of the unoccupied and exposed active centers. As solvation progresses, disgregation proceeds and more centers are exposed. The process is greatly enhanced by materials that cause swelling of the film. Eventually, the solvent penetrates to the substrate and breaks the bonds between the substrate and the film.

In the film stripper composition of the invention the halogenated hydrocarbons are believed mainly responsible for the swelling of the films. The halo-aromatics are less desirable because of their toxicity and skin irritation properties. The chloro-aliphatic materials containing below 10 and preferably 1 to 6 carbon atoms have been found most suitable. Exemplary materials are 1,1,1-trichloroethylene, ethylene dichloride, trichloroethane, methylene dichloride, chloroform, propylene dichloride, carbon tetrachloride and perchlorethylene. A most effective stripper is provided by a mixture of polychloro compounds, such as methylene chloride, combined with other polyhalogenated materials, such as trichloroethylene, ethylene dichloride and trichloroethane, with the latter materials in predominant amount, usually about 55 to 65 percent of the halogenated hydrocarbon mixture.

The alcohols are preferably lower alkanols of 1 to 8 carbon atoms such as ethanol, isopropanol, butanol, pentanol and hexanol. Mixtures of more than one alcohol appear to provide an increased rate of solvation by increasing the ability of the mixture to penetrate the film. Exemplary ketones are acetone, methyl-ethyl ketone and methyl isobutyl ketone. Again, the lower derivative containing 1 to 8 carbon atoms is preferred.

The stripper of the invention contains less than 2 by volume of water and contains no organic or inorganic acids, bases or oxidizing agents. Various other additives, such as surface active agents, wetting agents, corrosion inhibitors and thickening agents, may be present in minor amounts.

BRIEF DESCRIPTION OF THE DRAWINGS

The invention will now become better understood by reference to the following detailed description when considered in conjunction with the accompanying drawings.

Figure 1A:
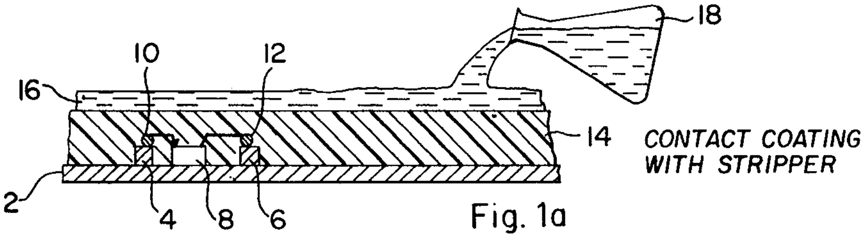
FIGS. 1*a*, 1*b* and 1*c* are a series of cross-sectional views illustrating the steps involved in stripping the coating from a conformally coated finished printed circuit board.
Figure 1B:
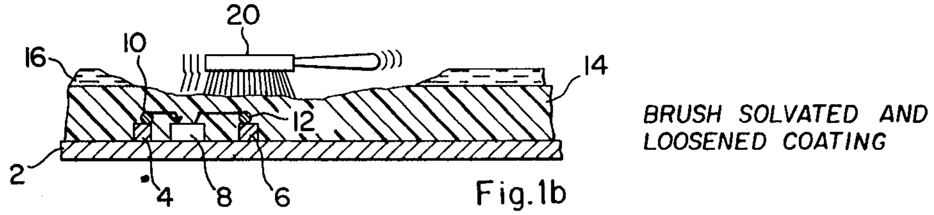
Figure 1C:
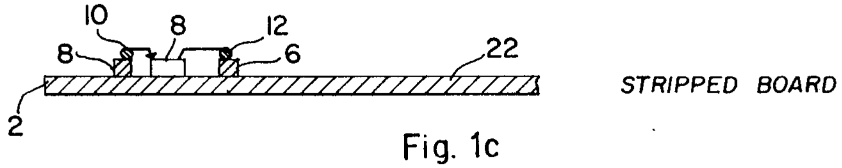

Referring no. 1*a*, 1*b* and 1*c*, a printed circuit board comprises an insulating substrate 2 on which is printed a series of conductive lines 4 and 6. A miniature electronic component such as a transistor 8 is mounted between lines 4 and 6 by means of welded connections 10 and 12. The top surface 22 of the board is covered with a layer 14 of a conformal coating material such as an epoxy resin.

The coating 14 is removed by contacting the coating with a liquid stripper 16 according to the invention. The stripper may be poured from a container 18 onto the top surface of the coating or may be applied by dipping, brushing, spraying, etc. It is preferred to avoid immersion techniques with printed circuit boards having insulating substrates containing resins such as epoxy-glass laminates, since, over prolonged periods, the substrate itself may be softened and dissolved. After a few minutes, the coating begins to soften and its removal from the board is hastened by applying mechanical forces to the board, such as by rubbing with a brush 20. Additional stripper may be applied to the surface exposed by brushing away the softened, gummy solvated resin. Within ten minutes from application of the solvent to the conformally coated area, the conformal coating softens and becomes detached from the printed circuit board substrate. Further application of the solvent with occasional brushing over a 2 hour period results in the complete removal of the coating with no detrimental effect on the board itself and stampings on the board are not affected.

If the location of the damaged component on the board is known, the complete conformal coating need not be removed, but the area of the coating above the component may be selectively removed by applying a drop of the stripper solution to the coating directly above the component. The spot to be removed can be further localized by masking the area around the component with a tape resistant to the stripper solution such as a Teflon tape.

The stripper solution of the invention may be used with other resinous coating besides epoxies. It is found to be more effective with the aliphatic amine cured bisphenol-type epoxies which require higher temperatures to show similar solvation effects. The stripper may be utilized to remove resins from other devices whether electrical or mechanical such as coils, rectifiers, capacitors, ferrite cores, diodes, triodes, etc.

DESCRIPTION OF THE PREFERRED EMBODIMENTS

A formulation for a preferred stripper composition according to the invention is described below. It is to be understood that this is offered by way of illustration only and is not intended in any way to limit the invention.

The stripper contains the following ingredients between the stated ranges on a volume basis:

| | |
|---|---|
| 1,1,1-Trichloroethane | 10–12% |
| Ethylene Dichloride | 8–10% |
| Trichloroethylene | 28–30% |
| Methylene Chloride | 40–43% |
| Ethyl Alcohol | 5–6% |
| Acetone | 1–2% |
| Methyl-Ethyl-Keton | up to 0.5% |
| Isopropyl Alcohol | 1–2% |
| Water | less than 1% |

A portion of the above-described stripping solution was applied to a printed circuit board coated with a conformal coating of Hysol 12–007, an aliphatic amine cured epoxy resin curing system. Hysol 12–007 is a 100 percent solids epoxy conformal coating material which meets the requirements of NASA Specification MSFC-Spec-222 (Type I) or Military Specification MIL-I-46058 B (Type ER). Hysol 12–007 has an epoxy equivalent of about 180–200 and an amine value of 3.1 to 4.6. It is applied to printed circuit boards in thicknesses of from 1 to 6 mils.

Within 10 minutes from the application of the stripper to this coating, the coating softens and becomes gummy which is removed by brushing. Further application of the stripper over a 2 hour period with periodic brushing resulted in complete removal of the coating from the printed circuit board. The top epoxy buttercoat of the board laminate showed no evidence of adverse effect and the components and the lines on the board were unaffected. The board was recoated with Hysol 12–007 and the conformal coating reattached to the printed circuit board laminate completely and effectively.

The stripping composition of the invention saves time and materials in the repair and reworking of electronic components. The composition can be utilized without substantial hazard or irritation to operating personnel and requires much less critical control and, therefore, the stripping operation can be performed by less-skilled operating personnel. The stripper composition of the invention has been utilized in the field to successfully repair and rework printed circuit boards to salvage boards containing off-spec or damaged components which would otherwise have to be destroyed or returned to the main manufacturing plant.

It is to be understood that only preferred embodiments of the invention have been disclosed and that numerous substitutions, modifications and alterations are all permissible without departing from the scope of the invention as described in the following claims.

The embodiments of the invention in which an exclusive property or privilege is claimed are defined as follows:

1. A method of stripping an adherent coating of epoxy resin from an electronic component circuit board comprising contacting said resin for a period sufficient to loosen and solvate said resin with a substantially anhydrous liquid stripping composition consisting of on a volume basis:

at least about 60 percent of a polychlorinated aliphatic liquid, said liquid consisting of at least one polychlorinated aliphatic compound having a carbon content of 1 to 10 carbon atoms;

from about 4 to 12 percent of an alcohol;

from about 1 to 5 percent of a ketone; and below about 2 percent water.

2. A method according to claim 1 in which said liquid is impregnated through said resin to said board.

3. A method according to claim 1 further comprising the step of mechanically removing the liquid stripper-softened resin resulting from said contact step.

4. A method according to claim 3 in which said softened resin is removed by brushing.

5. A method according to claim 1 in which about 35 to 45 percent by volume of the polychlorinated aliphatic liquid comprises methylene chloride.

6. A method according to claim 5 in which said alcohol and ketone each contain 1 to 8 carbon atoms.

7. A method of stripping cured epoxy conformal resin coatings from printed circuit boards comprising the steps of:

contacting said coating with a liquid stripping composition consisting essentially of, on a volume basis:

| | |
|---|---|
| 1,1,1-Trichloroethane | 10–12% |
| Ethylene Chloride | 8–10% |
| Trichloroethylene | 28–30% |
| Methylene Chloride | 40–43% |
| Ethyl Alcohol | 5–6% |
| Acetone | 1–2% |
| Methyl-Ethyl-Ketone | 0.5% |
| Isopropyl Alcohol | 1–2% |
| Water | less than 1% |

until said coating is softened and solvated; and removing said coating from said board.

8. An epoxy resin stripping composition, in which composition is a liquid at ambient temperatures, for stripping epoxy resin from an electronic component circuit board consisting of on a volume basis:

| | |
|---|---|
| 1,1,1-Trichloroethane | 10–12% |
| Ethylene Chloride | 8–10% |
| Trichloroethylene | 28–30% |
| Methylene Chloride | 40–43% |
| Ethyl Alcohol | 5–6% |
| Acetone | 1–2% |
| Methyl-Ethyl-Ketone | 0.5% |
| Isopropyl Alcohol | 1–2% |
| Water | less than 1%. |

* * * * *